United States Patent
Dai et al.

(10) Patent No.: US 11,429,552 B2
(45) Date of Patent: Aug. 30, 2022

(54) DATA LINK CHANGES BASED ON REQUESTS

(71) Applicant: Hewlett-Packard Development Company, L.P., Spring, TX (US)

(72) Inventors: Fangyong Dai, Spring, TX (US); Richard S. Lin, Spring, TX (US); Baosheng Zhang, Spring, TX (US); Xiang Ma, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/052,384

(22) PCT Filed: Jan. 9, 2019

(86) PCT No.: PCT/US2019/012811
§ 371 (c)(1),
(2) Date: Nov. 2, 2020

(87) PCT Pub. No.: WO2020/145956
PCT Pub. Date: Jul. 16, 2020

(65) Prior Publication Data
US 2021/0365399 A1    Nov. 25, 2021

(51) Int. Cl.
*G06F 13/42*    (2006.01)
*G06F 13/362*   (2006.01)
*G06F 13/40*    (2006.01)
*H04L 69/14*    (2022.01)
*H04L 47/10*    (2022.01)

(52) U.S. Cl.
CPC ...... *G06F 13/4221* (2013.01); *G06F 13/3625* (2013.01); *G06F 13/4059* (2013.01); *H04L 69/14* (2013.01); *H04L 47/10* (2013.01)

(58) Field of Classification Search
CPC ............ G06F 13/4022; G06F 13/4221; G06F 13/3625; G06F 13/4059; G06F 13/4282; H06F 2213/0026; H04L 69/14
See application file for complete search history.

(56) References Cited

U.S. PATENT DOCUMENTS

| | | |
|---|---|---|
| 7,158,536 B2 | 1/2007 | Ching et al. |
| 7,293,127 B2 | 11/2007 | Caruk |
| 8,341,303 B2 | 12/2012 | Solomon et al. |

(Continued)

FOREIGN PATENT DOCUMENTS

| | | |
|---|---|---|
| GB | 2555601 A | 5/2018 |
| WO | WO-2013006586 A1 | 1/2013 |

*Primary Examiner* — Brian T Misiura
(74) *Attorney, Agent, or Firm* — HPI Patent Department

(57) ABSTRACT

An electronic device includes a transmit buffer, a receive buffer, a communication port, and a controller. The controller is to: communicate with a target device via a data link established via the communication port; determine a throughput ratio between the transmit buffer and the receive buffer; in response to a determination that the throughput ratio is above a threshold, transmit a request to the target device to change an aspect of the data link, where the request includes a payload size indicating an amount of data to be transmitted from the electronic device to the target device; and in response to receiving a grant message associated with the request, increase an amount of transmit lanes within the data link from the electronic device to the target device.

3 Claims, 6 Drawing Sheets

(56) References Cited

U.S. PATENT DOCUMENTS

| | | |
|---|---|---|
| 9,323,698 B2 | 4/2016 | Park et al. |
| 9,535,866 B2 | 1/2017 | Marks et al. |
| 9,654,342 B2 | 5/2017 | Jaussi et al. |
| 10,007,441 B2 * | 6/2018 | Fuxa .................... G06F 3/0625 |
| 10,009,245 B2 * | 6/2018 | Watanabe ........... H04L 41/0659 |
| 2005/0262284 A1 | 11/2005 | Cherukuri et al. |
| 2007/0233930 A1 * | 10/2007 | Gallagher ............ G06F 13/4018 |
| | | 710/307 |
| 2009/0094401 A1 * | 4/2009 | Larson .................... H04L 47/32 |
| | | 710/316 |
| 2012/0131278 A1 * | 5/2012 | Chang ................... G06F 1/3268 |
| | | 711/E12.017 |
| 2014/0281068 A1 | 9/2014 | Das Sharma et al. |
| 2017/0083475 A1 | 3/2017 | Wu et al. |
| 2018/0113828 A1 | 4/2018 | Ellis et al. |
| 2019/0042524 A1 * | 2/2019 | Das Sharma ....... G06F 13/4282 |
| 2019/0138470 A1 * | 5/2019 | Li ....................... G06F 13/4022 |

\* cited by examiner

DATA LINK CHANGES BASED ON REQUESTS

BACKGROUND

Serial communication, where data is transmitted sequentially one bit at a time over a data link, has been adopted by many protocols to facilitate communications between two electronic devices. Some example serial communication protocols may include Universal Serial Bus and Peripheral Component Interconnect Express (PCIe).

BRIEF DESCRIPTION OF THE DRAWINGS

Some examples of the present application are described with respect to the following figures.

DETAILED DESCRIPTION

Figure 1:
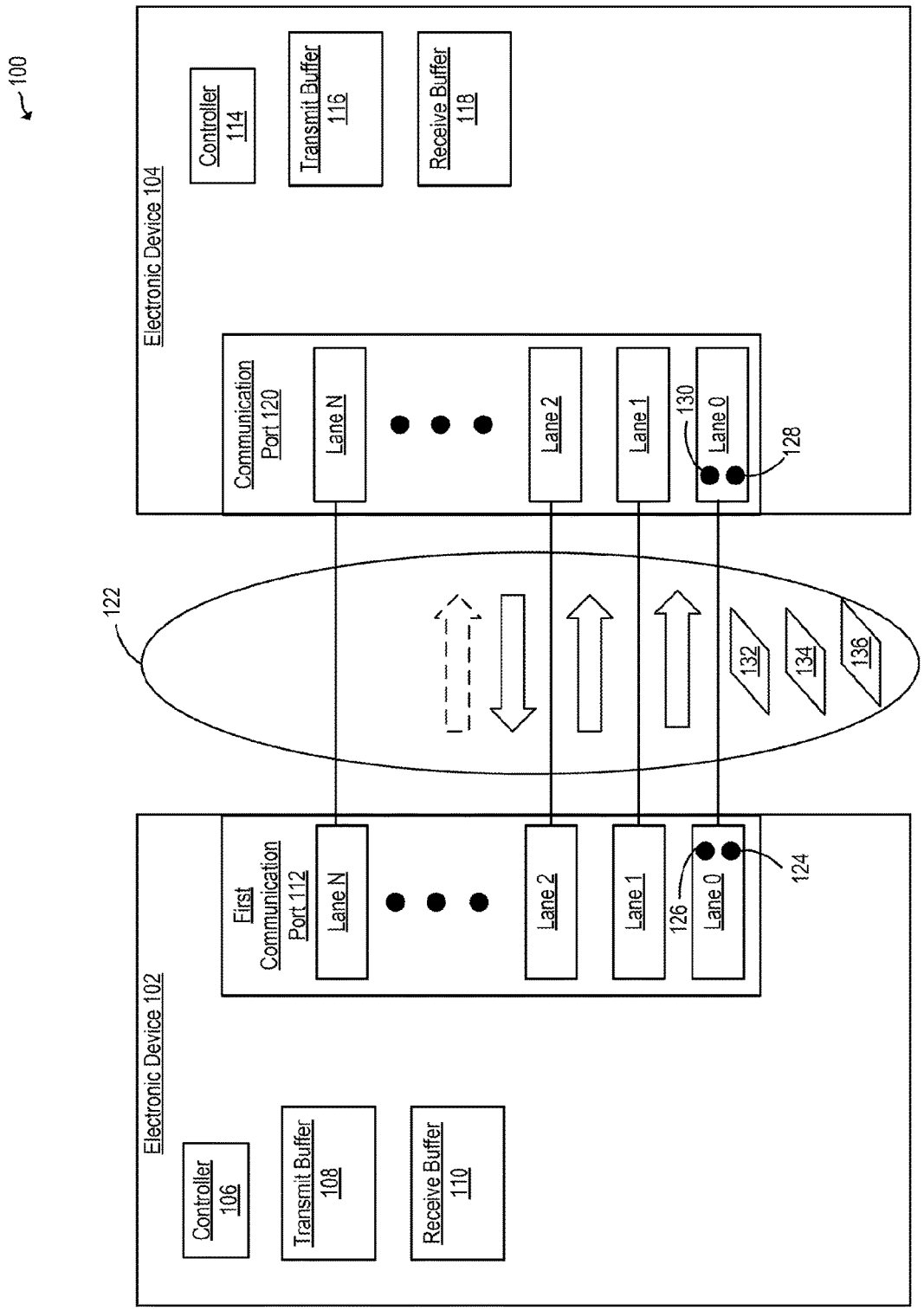
FIG. 1 illustrates a system to change an aspect of a data link based on a request, according to an example.

A serial communication protocol may enable full duplex communication (i.e., bidirectional simultaneous transmissions) between two devices. In some serial communication protocols, such as the Universal Serial Bus (USB) protocol, full duplex communication may be implemented by a dual simplex approach. In a dual simplex approach, a pair of lanes is used where one lane is transmit only and the other lane is receive only. However, the dual simplex approach may be inefficient as the flow of data between two devices may be uneven. For example, when reading data from device A to device B, the transmit lane of device A may have much higher data flow than the receive lane of device A. Thus, the uneven flow of traffic may create an inefficiency as one data lane may be underutilized while the other data lane may be fully utilized.

Examples described herein provide an approach to change an aspect of a data link based on a request to increase data lane utilization efficiency. For example, an electronic device may include a transmit buffer, a receive buffer, a communication port, and a controller. The controller may communicate with a target device via a data link established via the communication port. The controller may also determine a throughput ratio between the transmit buffer and the receive buffer. In response to a determination that the throughput ratio is above a threshold, the controller may transmit a request to the target device to change an aspect of the data link. The request may include a payload size indicating an amount of data to be transmitted from the electronic device to the target device. In response to receiving a grant message associated with the request, the controller may increase an amount of transmit lanes within the data link from the electronic device to the target device.

In another example, an electronic device may include a first communication port, a second communication port, and a controller. The controller may communicate with a target device via a data link established via the first communication port. In response to detecting a connection status change associated with the second communication port, the controller may transmit a request to the target device to change an aspect of the data link. In response to receiving a grant message that includes a start time, initiate an operation with target device to change the aspect of the data link at the start time.

In another example, an electronic device may include a transmit buffer, a communication port, and a controller. The controller may communicate with a source device via a data link established via the communication port. The controller may also receive a request to change an aspect of the data link from the source device. The request may include a payload size indicating an amount of data to be transmitted from the source device to the electronic device. The controller may further determine a time sensitivity of data in the transmit buffer. The controller may accept the request when the time sensitivity is below a threshold. The controller may deny the request when the time sensitivity is greater than or equal to the threshold. Thus, examples described herein may increase an efficiency associated with utilizing lanes to transport data.

FIG. 1 illustrates a system 100 to change an aspect of a data link based on a request, according to an example. System 100 may include an electronic device 102 and an electronic device 104.

As used herein, electronic device 102 and electronic device 104 may each be, for example, a notebook computer, a desktop computer, an all-in-one computer, a tablet computing device, a web-based server, a local area network server, a cloud-based server, a cellular phone, an electronic component/circuitry on a printed circuit board (PCB), or any other device suitable to communicate electronically with another device.

Electronic device 102 may include a controller 106, a transmit buffer 108, a receive buffer 110, and a first communication port 112. Electronic device 104 may include a controller 114, a transmit buffer 116, a receive buffer 118, and a communication port 120.

As used herein, controllers 106 and 114 may each be a central processing unit (CPU), a semiconductor-based microprocessor, an embedded microcontroller, and/or other hardware devices suitable for retrieval and execution of instructions stored in electronic device 102 and electronic device 104, respectively. Controller 106 may control operations of electronic device 102. Controller 114 may control operations of electronic device 104.

As used herein, buffers 108, 110, 116, and 118 may each be a distinct region of memory that temporarily stores data while the data is being moved from one location to another location. Buffers 108, 110, 116, and 118 may be implemented using volatile memory and/or non-volatile memory. For example, volatile memory may be random-access memory (RAM). Non-volatile memory may be solid-state memory. Transmit buffer 108 may store data to be transmitted from electronic device 102 to electronic device 104. Receive buffer 110 may store data received from electronic device 104. Transmit buffer 116 may store data to be transmitted from electronic device 104 to electronic device 102. Receive buffer 118 may store data received from electronic device 102.

As used herein, first communication port 112 and communication port 120 may each be a distinct physical outlet to which another device may connect. First communication port 112 and communication port 120 may be implemented using a plurality of electrical contacts or pins.

Electronic device 102 may be connected to electronic device 104 via first communication port 112 and communication port 120, respectively. For example, a cable may be used to form the physical connection. A data link 122 may be established between electronic device 102 and electronic device 104 to enable data exchanges. As used herein, data link 122 may be a logical connection or channel. In some examples, data link 122 may be implemented in a physical cable or a trace routing. Data link 122 may include any number of lanes to transport the data from one device to another. In some examples, data link 122 may include a single lane. In some examples, data link 122 may include a plurality of lanes. In the example illustrated in FIG. 1, data link 122 may include lanes 0, 1, 2, and N. As used herein, each lane may be a distinct physical connection between first communication port 112 and communication port 120 used to transport data. For example, when differential signaling is used to transport data, lane 0 may be the connection formed using a pair of electrical contacts 124 and 126 in first communication port 112 and a pair of electrical contacts 128 and 130 in communication port 120. Electrical contact 124 may be connected to electrical contact 128 (e.g., via a cable) and electrical contact 126 may be connected to electrical contact 130. Lanes 1, 2, and N may be similarly implemented. Each lane 0, 1, 2, and N may be omnidirectional in terms of data flow (i.e., data is transported one way either from electronic device 102 to electronic device 104 or from electronic device 104 to electronic device 102).

During operation, electronic device 102 may transmit data to electronic device 104 via lanes 0 and 1. Thus, lanes 0 and 1 may be transmit lanes with respect to electronic device 102. Electronic device 104 may transmit data to electronic device 102 via lane 2. Thus, lane 2 may be a receive lane with respect to electronic device 102. As described above, transmit buffer 108 may store data to be transmitted from electronic device 102 to electronic device 104. Receive buffer 110 may store data received from electronic device 104. Controller 106 may monitor a throughput of transmit buffer 108 that corresponds to a rate at which transmit buffer 108 is filled. Controller 106 may also monitor a throughput of receive buffer 110 that corresponds to a rate at which receive buffer 110 is filled.

Controller 106 may determine a throughput ratio between transmit buffer 108 and receive buffer 110 by comparing the throughput of transmit buffer 108 and the throughput of receive buffer 110. The throughput ratio may indicate whether a traffic flow imbalance exists at electronic device 102. For example, the throughput ratio may be 2, which indicates that transmit buffer 108 is filling twice as fast as receive buffer 110. As another example, the throughput ratio may be 0.5, which indicates that receive buffer 110 is filling twice as fast as transmit buffer 108.

Controller 106 may compare the throughput ratio to a threshold (e.g., the threshold may be 2). In response to a determination that the throughput ratio is above the threshold, controller 106 may change an aspect of data link 122 to improve lane utilization. In some examples, in response to a determination that the throughput ratio is above the threshold, controller 106 may transmit a request 132 to electronic device 104 to change an aspect of data link 122. Controller 106 may transmit request 132 via one of the transmit lanes (Lane 0 or Lane 1). Request 132 may include information on what aspect of data link 122 is to be changed, how the aspect is to be changed, how long the change is to last, information about the data to be transmitted, or a combination thereof. For example, request 132 may include information on a number of lanes (e.g., 2) to be changed from receive lane to transmit lane. Request 132 may also include a payload size indicating an amount of data to be transmitted from electronic device 102 to electronic device 104. Controller 106 may compute the amount of data based on the throughput ratio. In some examples, the amount of data may correspond to the delta between the throughput of transmit buffer 108 and the throughput of receive buffer 110. In some examples, controller 106 may compute the amount of data such that the throughput ratio may be reduced. In some examples, instead of the payload size, request 132 may include a time duration to indicate an amount of time that a change to an aspect of data link 122 is to last. The time duration may correspond to an amount of time takes to transmit an amount of data equal to the payload size.

In response to receiving request 132, controller 114 may determine whether to accept or deny request 132 based on data in transmit buffer 116. In some examples, controller 114 may determine whether to accept or deny request 132 based on how time sensitive the data in transmit buffer 116 is. For example, the data in transmit buffer 116 may be time sensitive due to content the data is associated with, such as video data or voice data. Delay in the transmission of such time sensitive data may cause performance loss (e.g., dropped video frame). In some examples, the data in transmit buffer 116 may be time sensitive due to a quality of service (QoS) requirement (e.g., a latency requirement associate with data transmission). In some examples, the data in transmit buffer 116 may be less time sensitive, such as data associated with an E-mail.

In some examples, each unit of data to be transmitted in transmit buffer 116 may include a distinct time sensitivity. Each time sensitivity may be a value that indicates how sensitive the unit of data is to transmission delay. For example, a time sensitivity of 1 may indicate that the associated unit of data is not time sensitive. Thus, delaying the transmission of the data than the scheduled transmission time may be acceptable. As another example, a time sensitivity of 10 may indicate that the associated unit of data is highly time sensitive. Thus, any delay to the scheduled transmission is not acceptable. As another example, a time sensitivity of 5 may indicate that the associated unit of data is mildly time sensitive. Thus, some delays (e.g., less than 1 second) may be acceptable, but other delays (e.g., more than 1 second) may be unacceptable.

Controller 114 may assign a time sensitivity to each unit of data based on a set of criteria. In some examples, the set of criteria may include a source of the data, a destination of the data, a QoS requirement of the data, a protocol used to transmit the data (e.g., Transmission Control Protocol (TCP)), an application associated with the data (e.g., a video game), or a combination thereof.

In response to receiving request 132, controller 114 may compare a time sensitivity of an amount of data in transmit buffer 116 that is equal to the payload size in request 132 to a threshold. When the time sensitivity is below the threshold, controller 114 may accept request 132. When the time sensitivity is greater than or equal to the threshold, controller 114 may deny request 132. In some examples, controller 114 may compare the time duration in request 132 to the time sensitivity of the amount of data. Controller 114 may compute the threshold based on the payload size and/or the time duration. Controller 114 may transmit a deny message 136 to electronic device 102 to deny request 132.

When controller 114 accepts request 132, controller 114 may transmit a grant message 134 to electronic device 102 via lane 2. Grant message 134 may include a start time. The start time may indicate a time at which controller 106 is to initiate a change an aspect of data link 122. In some examples, the aspect of data link 122 to be changed may include changing directions of lanes so that an amount of transmit lanes with respect to electronic device 102 is increased. Increasing the amount of transmit lanes with respect to electronic device 102 is described in more detail below.

Besides transmitting grant message 134, controller 114 may configure circuitry associated with lane 2 to change the direction of lane 2 from a transmit lane to a receive lane. For example, upon the start time, controller 114 may disconnect lane 2 from transmit buffer 116 and connect lane 2 to receive buffer 118. In response to receiving grant message 134 at electronic device 102 and upon the start time, controller 106 may initiate the change to the aspect of data link 122 by configuring circuity associated with lane 2 within electronic device 102 to change lane 2 from a receive lane to a transmit lane. For example, controller 106 may disconnect lane 2 from receive buffer 110 and connect lane 2 to transmit buffer 108. When the configuration is completed, controller 106 may begin transmitting data to electronic device 104 via lane 2 while continuing to transmit data via lanes 0 and 1. Thus, electronic device 102 may increase transmit lanes from 2 to 3. In some examples, the start time may be omitted or left as blank. Thus, controller 106 may initiate the change as soon as receiving grant message 134.

Controller 106 may monitor the amount of data transmitted via lane 2. When the amount matches the payload size, controller 106 may configure the circuitry associated with lane 2 to change lane 2 back to a receive lane. Controller 106 may disconnect lane 2 from transmit buffer 108 and connect lane 2 to receive buffer 110. Similarly, controller 114 may also monitor the amount of data received via lane 2. When the amount matches the payload size, controller 114 may configure the circuitry associated with lane 2 to change lane 2 back to a transmit lane. Controller 114 may disconnect lane 2 from receive buffer 118 and connect lane 2 to transmit buffer 116. Controller 114 may then begin to transmit data to electronic device 102 via lane 2. In some examples, instead of monitoring the amount of data transmitted via lane 2, controllers 106 and 114 may monitor time elapsed since lane 2 is changed to a transmit lane when request 132 includes the time duration. Upon the expiration of the time duration, controllers 106 and 114 may configure lane 2 back to a receive lane as described above.

Although FIG. 1 is described with reference to changing the direction of lane 2, it should be understood that the directions of any number of lanes may be changed to alleviate the traffic flow imbalance. As described in more detail in FIG. 2, changing an aspect of data link 122 may also include changing a protocol to transmit data, a bandwidth of the data link, or a combination thereof.

Figure 2:
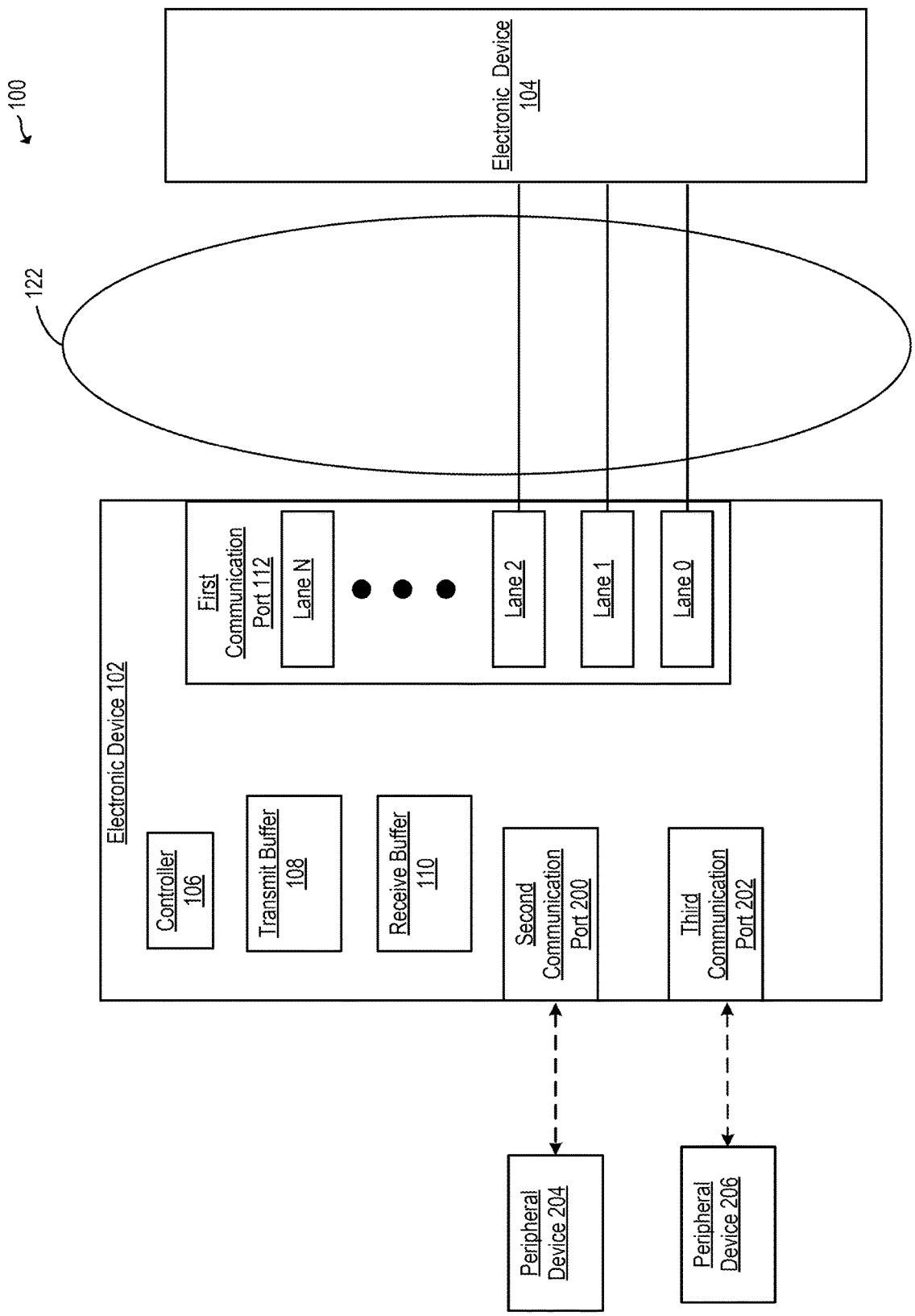
FIG. 2 illustrates a system to change an aspect of a data link based on a request, according to another example.

FIG. 2 illustrates system 100 to change an aspect of a data link based on a request, according to another example. In some examples, electronic device 102 may also include a second communication port 200 and a third communication port 202. In some examples, communication ports 200 and 202 may be similar to first communication port 112. In some examples, second communication port 200 may be implemented based on a first protocol and third communication port 202 may be implemented based on a second protocol that is different from the first protocol. As an example, the first protocol may be Serial AT Attachment (SATA) and the second protocol may be Universal Serial Bus (USB).

During operation, electronic device 102 may change an aspect of data link 122 in response to detecting a connection status change associated with second communication port 200, third communication port 202, or a combination thereof. The aspect of data link 122 may include increasing an amount of transmit lanes within data link 122 as descried in FIG. 1, changing a protocol to transmit data, increasing a bandwidth of data link 122, or a combination thereof.

In some examples, at time T0, a peripheral device 204, such as a SATA hard drive, may be plugged into second communication port 200 (e.g., using a cable) to connect to electronic device 102. Third communication port 202 may be idle (i.e., no external device is plugged into third communication port 202). In response to detecting a connection status change associated with second communication port 200 that indicates an insertion of peripheral device 204 into second communication port 200, controller 106 may select SATA as a communication protocol to exchange data between peripheral device 204 and electronic device 104. Controller 106 may select the communication protocol based on a bandwidth usage of peripheral device 204. In some examples, controller 106 may transmit request 132 to inform electronic device 104 the protocol to be used over data link 122. Controller 114 may transmit grant message 134 to electronic device 102 to indicate the selection of the communication protocol is accepted. Electronic device 102 may then begin to initiate the change to data link 122 by exchanging set up information to establish the communication protocol with electronic device 104.

At time T1 (subsequent to time T0), a peripheral device 206 may be plugged into third communication port 202. Peripheral device 206 may be a USB docking station. In response to detecting a connection status change associated with third communication port 202 that indicates an insertion of peripheral device 206 into third communication port 202, controller 106 may change the communication protocol from SATA to Peripheral Component Interconnect Express (PCIe) to accommodate the increase in bandwidth usage.

Controller 106 may transmit request 132 to electronic device 104 to request a change to the communication protocol from SATA to PCIe. Controller 114 may transmit grant message 134 to electronic device 102 to indicate the change of the communication protocol is accepted. Electronic device 102 may then begin to exchange set up information to establish the new communication protocol (PCIe) with electronic device 104.

In some examples, at time T0, two transmit lanes may be used to transmit data from electronic device 102 to electronic device 104. At time T1, in addition to changing the communication protocol, controller 106 may also increase the amount of transmit lanes from two to four in response to detecting the connection status change associated with second communication port 200. Controller 106 may use request 132 to accomplish increasing the amount of transmit lanes in a manner similar to changing the communication protocol.

In some examples, at time T0, controller 106 may select USB 3.2 as the communication protocol of data link 122. At time T1, controller 106 may increase the bandwidth of data link 122 by changing the transfer mode from SuperSpeed to SuperSpeed+ in response to the connection status change associated with second communication port 200. Controller 106 may also increase the amount of transmit lanes. Controller 106 may use request 132 to accomplish increasing bandwidth of data link 122 in a manner similar to changing the communication protocol.

In some examples, when the protocol used to exchange data in data link 122 is changed, controller 106 and/or controller 104 may perform protocol translation for the payload. For example, controller 106 may convert data from peripheral device 206 from USB to PCIe. When electronic device 104 receives the data from electronic device 102. Controller 114 may convert the data from PCIe back to USB, then transmit the data to the final destination.

In some examples, when the amount of transmit lane is increased, the additional transmit lane may use different protocol than the other transmit lanes. For example, lane 0 may use PCIe and lane 2 may use USB. Multiple protocols may be used at the same time to transmit data across data link 122. Thus, protocol translation may be avoided.

At time T2 (subsequent to time T1), peripheral device 206 may be unplugged from third communication port 202. In response to detecting a connection status associated with third communication port 202 that indicates a removal of peripheral device 206 from third communication port 202, controller 106 may again change an aspect of data link 122. In some examples, controller 106 may transmit request 132 to electronic device 104 to reduce the amount of transmit lanes with respect to electronic device 102 within data link 122. Controller 106 may reduce the amount of transmit lanes by changing a direction of a transmit lane (e.g., lane 0 of FIG. 1) from transmit lane to receive lane with respect to electronic device 102.

In some examples, in response to detecting a connection status associated with third communication port 202 that indicates a removal of peripheral device 206 from third communication port 202, controller 106 may transmit request 132 to electronic device 104 to change the communication protocol. For example, controller 106 may change the communication protocol from PCIe back to SATA or from PCIe to USB.

In some examples, in response to detecting a connection status associated with third communication port 202 that indicates a removal of peripheral device 206 from third communication port 202, controller 106 may transmit request 132 to electronic device 104 to reduce the bandwidth of data link 122. For example, when the communication protocol is USB 3.2, controller 106 may use request 132 to change the transfer mode from SuperSpeed+ to SuperSpeed. Controller 106 may also reduce the amount of transmit lanes.

By dynamically changing an aspect of data link 122 in response to detecting a connection status change associated with second communication port 200 and/or, such as an insertion or removal of a peripheral device, communication over data link 122 may become more efficient (e.g., the likelihood of traffic congestion may be reduced by increasing the bandwidth of data link 122, power consumption of electronic device 102 and/or electronic device 104 may be reduce by reducing the bandwidth of data link 122).

Figure 3:
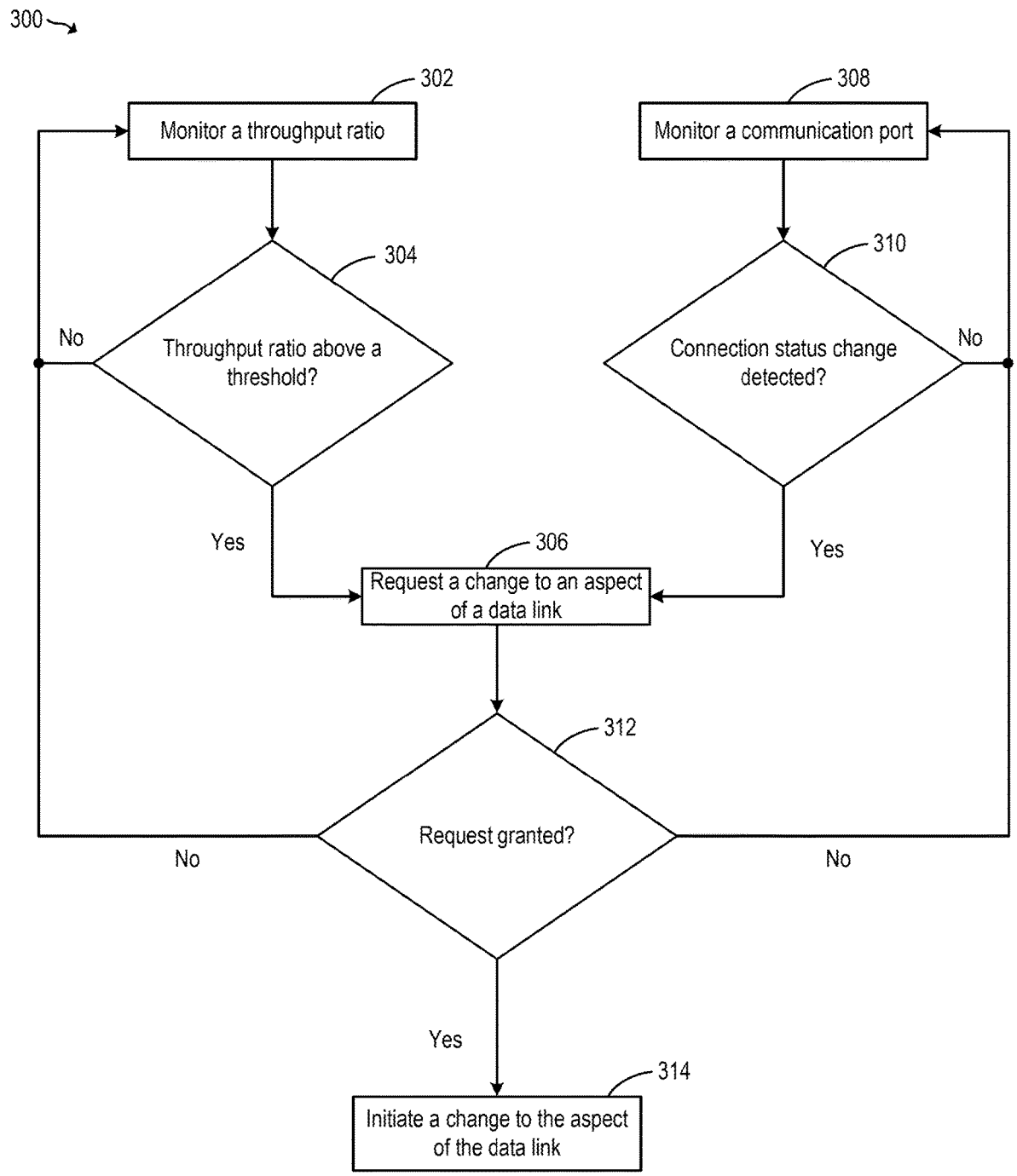
FIG. 3 illustrates a method of operation at an electronic device to change an aspect of a data link based on a request, according to an example.

FIG. 3 illustrates a method 300 of operation at an electronic device to change an aspect of a data link based on a request, according to an example. Method 300 may be implemented by a source device, such as electronic device 102. As used herein, a source device is a device that requests a change to an aspect of a data link.

Method 300 may include monitoring throughput ratio, at box 302. For example, electronic device 102 (via controller 106) may monitor a throughput ratio between transmit buffer 108 and receive buffer 110. Method 300 may also include determining if the throughput ratio is above a threshold, at box 304. For example, electronic device 102 may determine if the throughput ratio is above a threshold. In response to a determination that the throughput ratio is below or equal to the threshold, method 300 may move back to box 302. In response to a determination that the throughput ratio is above the threshold, method 300 may further include requesting a change to an aspect of a data link, at box 306. For example, electronic device 102 may transmit request 132 to electronic device 104 to request a change to an aspect of data link 122.

Method 300 may further include monitoring a communication port, at box 308. For example, electronic device 102 may monitor first communication port 112, second communication port 200, third communication port 202, or a combination thereof. Method 300 may further include determining if a connection status change associated with any of the monitored communication ports has been detected, at box 310. For example, electronic device 102 may determine if a connection status change associated with second communication port 200 has been detected. In response to a determination that a connection status change has not been detected, method 300 may move back to box 308. In response to a determination that a connection status change has been detected, method 300 may move to box 306. It should be understood that a source device may monitor the throughput ratio and the communication port(s) simultaneously.

Method 300 may further include determining if the request has been granted, at box 312. In response to a determination that the request has not been granted, method 300 may move back to box 302 and/or box 308. In response to a determination that the request has been granted, method 300 may further include initiating a change to the aspect of the data link, at box 314. For example, electronic device 102 may initiate the change by exchanging set up information with electronic device 104 to change a communication protocol to exchange data over data link 122.

Figure 4:
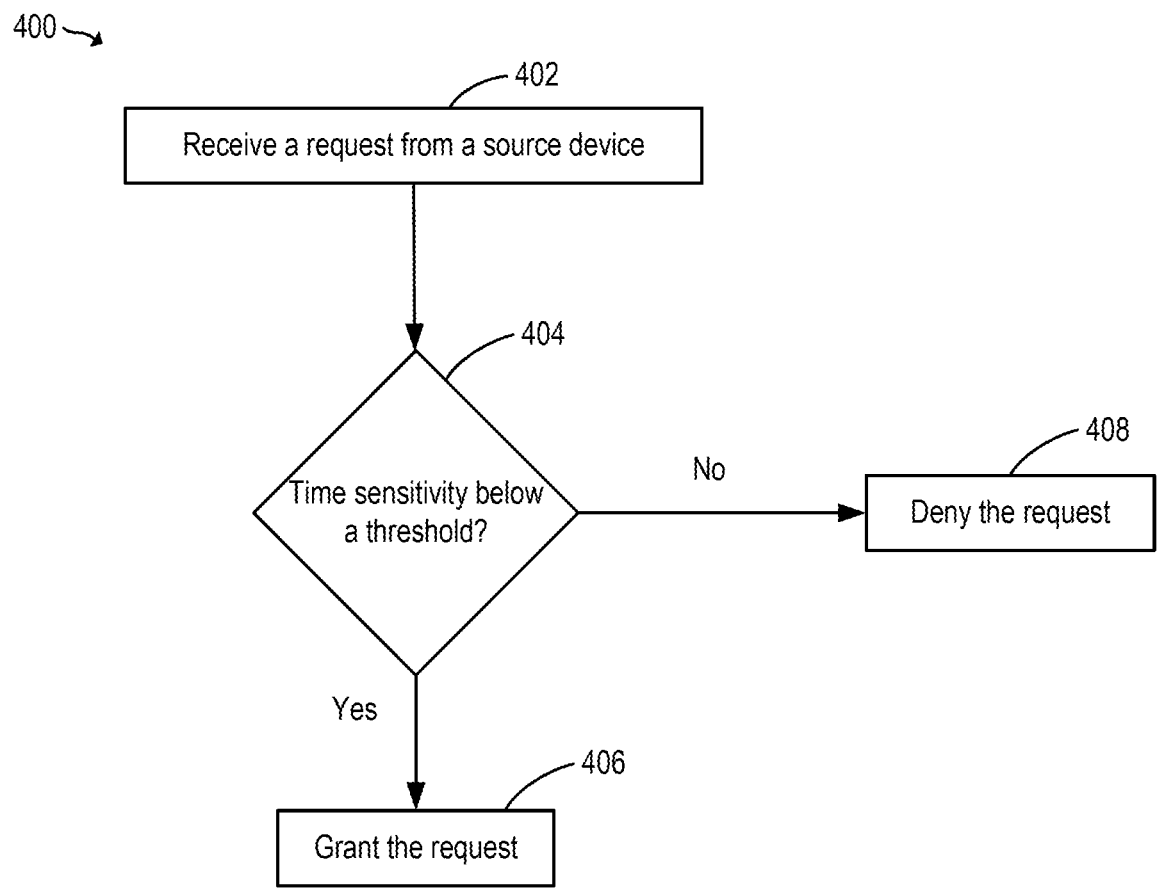
FIG. 4 illustrates a method of operation at an electronic device to change an aspect of a data link based on a request, according to another example.

FIG. 4 illustrates a method 400 of operation at an electronic device to change an aspect of a data link based on a request, according to another example. Method 400 may be implemented at a target device, such as electronic device 104. As used herein, a target device may be a device that receives a request to change an aspect of a data link.

Method 400 may include receiving a request from a source device, at box 402. For example, electronic device 104 may receive request 132 from a source device, such as electronic device 102. Method 400 may also include determining if a time sensitivity is below a threshold, at box 404. For example, electronic device 104 may compare a time sensitivity of an amount of data in transmit buffer 116 that is equal to the payload size in request 132 to a threshold.

In response to a determination that the time sensitivity is below the threshold, method 400 may further include granting the request, at box 406. For example, electronic device 104 may transmit grant message 134 to electronic device 102 when request 132 is granted. In response to a determination that the time sensitivity is greater than or equal to the threshold, method 400 may further include denying the request, at box 408. For example, electronic device 104 may deny request 132 via deny message 136.

Figure 5:
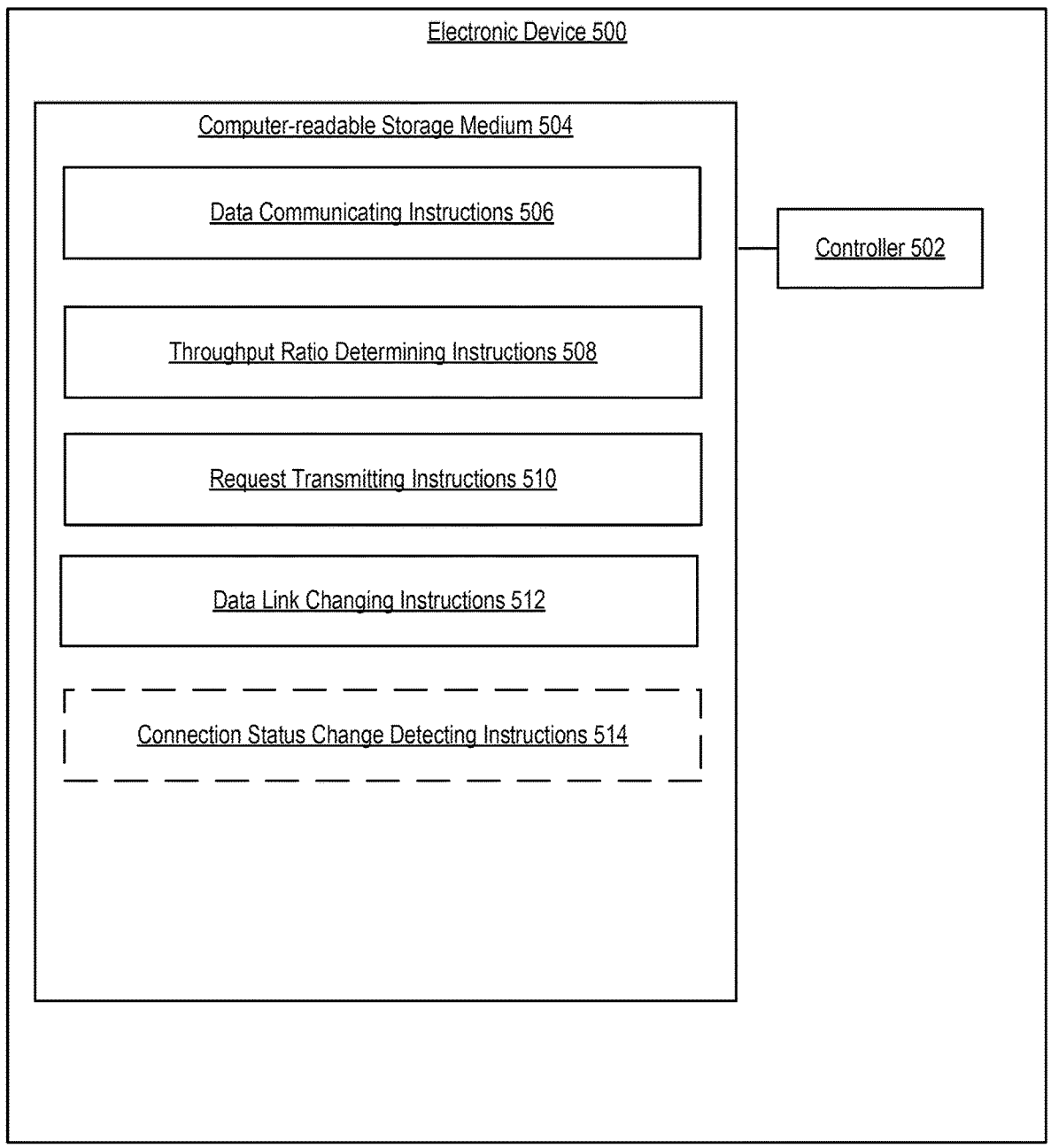
FIG. 5 illustrates an electronic device to change an aspect of a data link based on a request, according to an example.

FIG. 5 illustrates an electronic device 500 to change an aspect of a data link based on a request, according to an example. Electronic device 500 may implement as a source device, such as electronic device 102.

Electronic device 500 may include a controller 502 and a computer-readable storage medium 504. Controller 502 may be a central processing unit (CPU), a semiconductor-based microprocessor, an embedded microcontroller, and/or other hardware devices suitable for retrieval and execution of instructions stored in computer-readable storage medium 504. Computer-readable storage medium 504 may be any electronic, magnetic, optical, or other physical storage device that contains or stores executable instructions. Thus, computer-readable storage medium 504 may be, for example, Random Access Memory (RAM), an Electrically Erasable Programmable Read-Only Memory (EEPROM), a storage device, an optical disc, etc. In some examples, storage medium 504 may be a non-transitory storage medium, where the term "non-transitory" does not encompass transitory propagating signals. Computer-readable storage medium 504 may be encoded with controller executable instructions 506, 508, 510, and 512. In some examples, computer-readable storage medium 504 may also be encoded with instructions 514.

Data communicating instructions 506 may communicate data with another electronic device. For example, referring to FIG. 1, electronic device 102 may transmit data to electronic device 104 via lanes 0 and 1. Throughput ratio determining instructions 508 may determine a throughput ratio. For example, referring to FIG. 1, electronic device 102 may determine a throughput ratio between transmit buffer 108 and receive buffer 110 by comparing the throughput of transmit buffer 108 and the throughput of receive buffer 110.

Request transmitting instructions 510 may transmit a request to a target device, such as electronic device 104, to change an aspect of a data link. For example, referring to FIG. 1, electronic device 102 may transmit request 132 to electronic device 104. Data link changing instructions 512 may configure electronic device 102 to implement a change to an aspect of a data link. For example, electronic device 102 may initiate the change to the aspect of data link 122 by configuring circuity associated with lane 2 within electronic device 102 to change lane 2 from a receive lane to a transmit lane. Connection status change detecting instructions 514 may monitor a connection status change associated with a communication port of electronic device 500. For example, referring to FIG. 2, electronic device 102 may change an aspect of data link 122 in response to detecting a connection status change associated with second communication port 200, third communication port 202, or a combination thereof.

Figure 6:
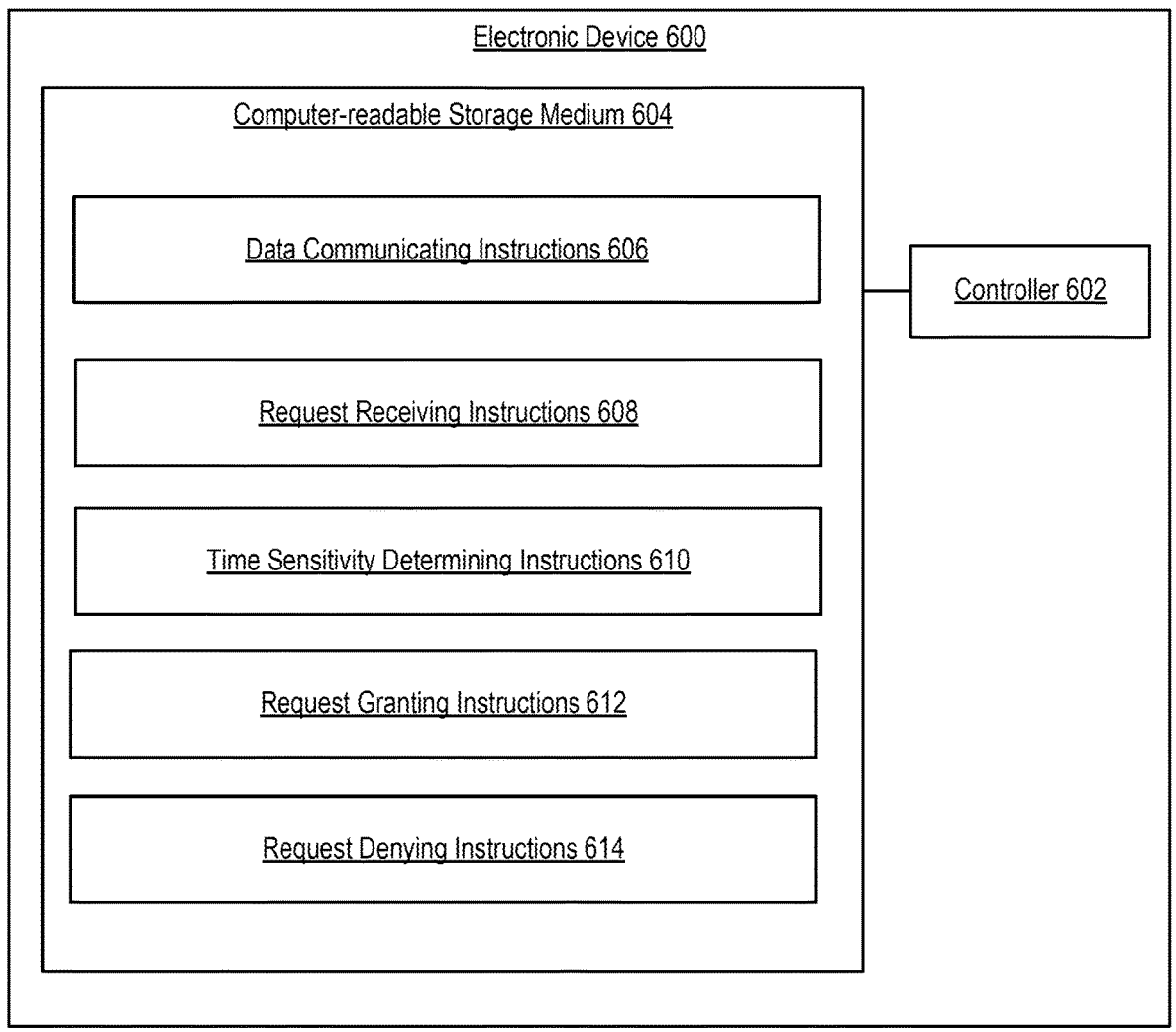
FIG. 6 illustrates an electronic device to change an aspect of a data link based on a request, according to an example.

FIG. 6 illustrates an electronic device 600 to change an aspect of a data link based on a request, according to an example. Electronic device 600 may implement a target device, such as electronic device 104.

Electronic device 600 may include a controller 602 and a computer-readable storage medium 604. Controller 602 may be similar to controller 502 of FIG. 5. Computer-readable storage medium 604 may be similar to computer-readable storage medium 504. Computer-readable storage medium 604 may be encoded with controller executable instructions 606, 608, 610, 612, and 614.

Data communicating instructions 606 may communicate data with another electronic device. For example, referring to FIG. 1, electronic device 104 may transmit data to electronic device 102 via lane 2. Request receiving instructions 608 may receive a request from a source device. For example, referring to FIG. 1, electronic device 104 may receive request 132 from electronic device 102. Time sensitivity determining instructions 610 may determine a time sensitivity of data in a transmit buffer (not shown) of electronic device 600. For example, referring to FIG. 1, electronic device 104 may determine a time sensitivity of data in transmit buffer 116.

Request accepting instructions 612 may grant a request to change an aspect of a data link. For example, referring to FIG. 1, electronic device 104 may grant request 132 by transmitting grant message 134 to electronic device 102. Request denying instructions 614 may deny the request. For example, referring to FIG. 1, electronic device 104 may deny request 132 by transmitting deny message 136 to electronic device 102.

The use of "comprising", "including" or "having" are synonymous and variations thereof herein are meant to be inclusive or open-ended and do not exclude additional unrecited elements or method steps.

What is claimed is:

1. An electronic device comprising:
    a transmit buffer;
    a receive buffer;
    a communication port; and
    a controller to:
        communicate with a target device via a data link established via the communication port;
        determine a throughput ratio between the transmit buffer and the receive buffer;
        in response to a determination that the throughput ratio is above a threshold, transmit a request to the target device to change an aspect of the data link, wherein the request includes a payload size indicating an amount of data to be transmitted from the electronic device to the target device; and
        in response to receiving a grant message associated with the request, increase an amount of transmit lanes within the data link from the electronic device to the target device, wherein the grant message includes a start time, and wherein the controller is to initiate a change to increase the amount of transmit lanes with the target device at the start time.

2. The electronic device of claim 1, wherein the throughput ratio is a ratio between a throughput of the transmit buffer and a throughput of the receive buffer.

3. The electronic device of claim 1, wherein the request also includes a number of lanes to be changed.

* * * * *